United States Patent
Oh et al.

(10) Patent No.: US 7,868,663 B2
(45) Date of Patent: Jan. 11, 2011

(54) RECEIVER CIRCUIT FOR USE IN A SEMICONDUCTOR INTEGRATED CIRCUIT

(75) Inventors: Ic-Su Oh, Ichon (KR); Kun-Woo Park, Ichon (KR); Yong-Ju Kim, Ichon (KR); Hee-Woong Song, Ichon (KR); Hyung-Soo Kim, Ichon (KR); Tae-Jin Hwang, Ichon (KR); Hae-Rang Choi, Ichon (KE); Ji-Wang Lee, Ichon (KR)

(73) Assignee: Hynix Semiconductor Inc. (KR)

( * ) Notice: Subject to any disclaimer, the term of this patent is extended or adjusted under 35 U.S.C. 154(b) by 153 days.

(21) Appl. No.: 12/171,214

(22) Filed: Jul. 10, 2008

(65) Prior Publication Data

US 2009/0058476 A1 Mar. 5, 2009

(30) Foreign Application Priority Data

Sep. 4, 2007 (KR) .................. 10-2007-0089474

(51) Int. Cl.
G01R 19/00 (2006.01)
G11C 7/00 (2006.01)
H03F 3/45 (2006.01)

(52) U.S. Cl. ...................... 327/55; 327/307
(58) Field of Classification Search ............ 327/51, 327/55, 218, 307
See application file for complete search history.

(56) References Cited

U.S. PATENT DOCUMENTS

| | | | |
|---|---|---|---|
| 5,422,909 A | 6/1995 | Love et al. | |
| 6,266,799 B1 | 7/2001 | Lee et al. | |
| 6,560,290 B2 | 5/2003 | Ahn et al. | |
| 6,922,083 B2 * | 7/2005 | Tanaka et al. | 327/55 |
| 7,411,420 B2 * | 8/2008 | Doi | 326/82 |
| 7,417,479 B2 * | 8/2008 | Kitayama | 327/175 |
| 2003/0214341 A1 * | 11/2003 | Cho et al. | 327/307 |

(Continued)

FOREIGN PATENT DOCUMENTS

JP 2002-158647 5/2002

(Continued)

OTHER PUBLICATIONS

James E. Jaussi, Ganesh Balamurugan, David R. Johnson, Bryan Casper, Aaron Martin, Joseph Kennedy, Naresh Shanbhag and Randy Mooney, "8-GB/s Source-Synchronous I/O Link With Adaptive Receiver Equalization, Offset Cancellation, and Clock De-Skew", IEEE Journal of Solid-State Circuits, Jan. 2005, pp. 80-88, vol. 40, No. 1.

(Continued)

Primary Examiner—Quan Tra
(74) Attorney, Agent, or Firm—Baker & McKenzie LLP

(57) ABSTRACT

A receiver circuit for sensing and transmitting input data in sync with a plurality of clock signals having mutually different phase sequentially enabled comprising a sense amplifier configured to receive, as offset voltages, first signals which can be obtained by amplifying the input data in sync with a first clock signal of the plurality of clock signals, being driven in sync with a second clock signal enabled subsequently to the first clock signal, and outputting second signals, and a discharging controller configured to control a discharging speed of the sense amplifier according to the offset voltages to control a driven speed of the sense amplifier.

16 Claims, 3 Drawing Sheets

U.S. PATENT DOCUMENTS

2007/0236258 A1* 10/2007 Kiziloglu et al. ............... 327/55
2008/0089155 A1* 4/2008 Bae ........................... 365/205

FOREIGN PATENT DOCUMENTS

| KR | 1020050002852 | 1/2005 |
| KR | 1020050002852 A | 1/2005 |
| KR | 100480597 | 3/2005 |

OTHER PUBLICATIONS

Troy Beukema, Michael Sorna, Karl Selander, Steven Zier, Brian L. Ji, Phil Murfet, James Mason, Woogeun Rhee, Herschel Ainspan, Benjamin Parker and Michael Beakes, "A 6.4-Gb/s CMOS SerDes Core With Feed-Forward and Decision-Feedback Equalization", IEEE Journal of Solid-State Circuits, Dec. 2005, pp. 2633-2645, vol. 40, No. 12.

F. Bien, Y. Hur, M. Maeng, H. Kim, E. Gebara and J. Laskar, "A Reconfigurable Fully-Integrated 0.18-um CMOS Feed-Forward Equalizer IC for 10-Gb/sec Backplane Links", ISCAS 2006, pp. 2117-2120.

* cited by examiner

RECEIVER CIRCUIT FOR USE IN A SEMICONDUCTOR INTEGRATED CIRCUIT

CROSS REFERENCE TO RELATED APPLICATIONS

The present application claims priority under 35 U.S.C. 119(a) to Korean application number 10-2007-0089474, filed on Sep. 4, 2007, in the Korean Intellectual Property Office, the disclosure of which is incorporated herein in its entirety by reference, as if set forth in full.

BACKGROUND

1. Technical Field

The embodiments described herein relate to semiconductor integrated circuits, and in particular, to a receiver circuit for a semiconductor integrated circuit.

2. Related Art

The need for low-power supply voltage capability and high-speed interfaces is becoming more prevalent for conventional semiconductor integrated circuits as the operational speeds of such circuits increases.

Input receivers within such conventional semiconductor integrated circuits, such as semiconductor memories, are configured to buffer external signals and to transfer the signals to internal circuits and systems. The buffering operation often converts the level of the received signal to a level that is compatible with the internal circuits. In this regard, the setup and hold time is an important factor in determining the response characteristics of the receiver. Input receivers are often designed to implement one of a plurality of signal interface standards such as LVTTL, HSTL, and GTL as required by the particular circuit/system.

As transmission speeds increase it becomes more difficult to ensure a sufficient sensing margin. Further, attenuation, such as Inter-Symbol Interference (ISI), of received signals can make it difficult for the receiver to accurately sense the signals.

Therefore, equalization methods are used to ensure an adequate sensing margin, and to compensate for signal attenuation loses. In reference to equalization, an FFE (feed-forward equalization) method is disclosed in "A Reconfigurable Fully-Integrated 0.18-gm CMOS Feed Forward Equalizer IC for 10-Gb/sec Back Plane Links" (ISCAS 2006). Further, a DEF (Decision Feedback Equalization) technique is disclosed in "8-Gb/s Source-Synchronous I/O Link with Adaptive Receiver Equalization, Offset Cancellation, and Clock signal De-Skew" (IEEE JSSC Vo. 40). Furthermore, feed-back and feed-forward methods are disclosed in "A 6.4 Gb/s CMOS SerDes Core with Feed-Forward and Decision-Feedback Equalization."

Unfortunately, circuit implementation of such solutions can be complicated and can occupy a large area, limiting integration. Further, in case of the FFE method, noise components of a signal may be amplified.

SUMMARY

Receiver circuits that require less area and have an enhanced sensing margin are described herein.

According to one aspect, a receiver circuit configured to sense and transmit input data in sync with a plurality of clock signals having mutually different phases comprises a sense amplifier configured to receive, as offset voltages, first signals obtained by amplifying the input data in sync with a first clock signal of the plurality of clock signals, being driven in sync with a second clock signal enabled subsequently to the first clock signal, and configured to output second signals, and a discharging controller controlling a discharging speed of the sense amplifier according to the offset voltages to control a driven speed of the sense amplifier.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
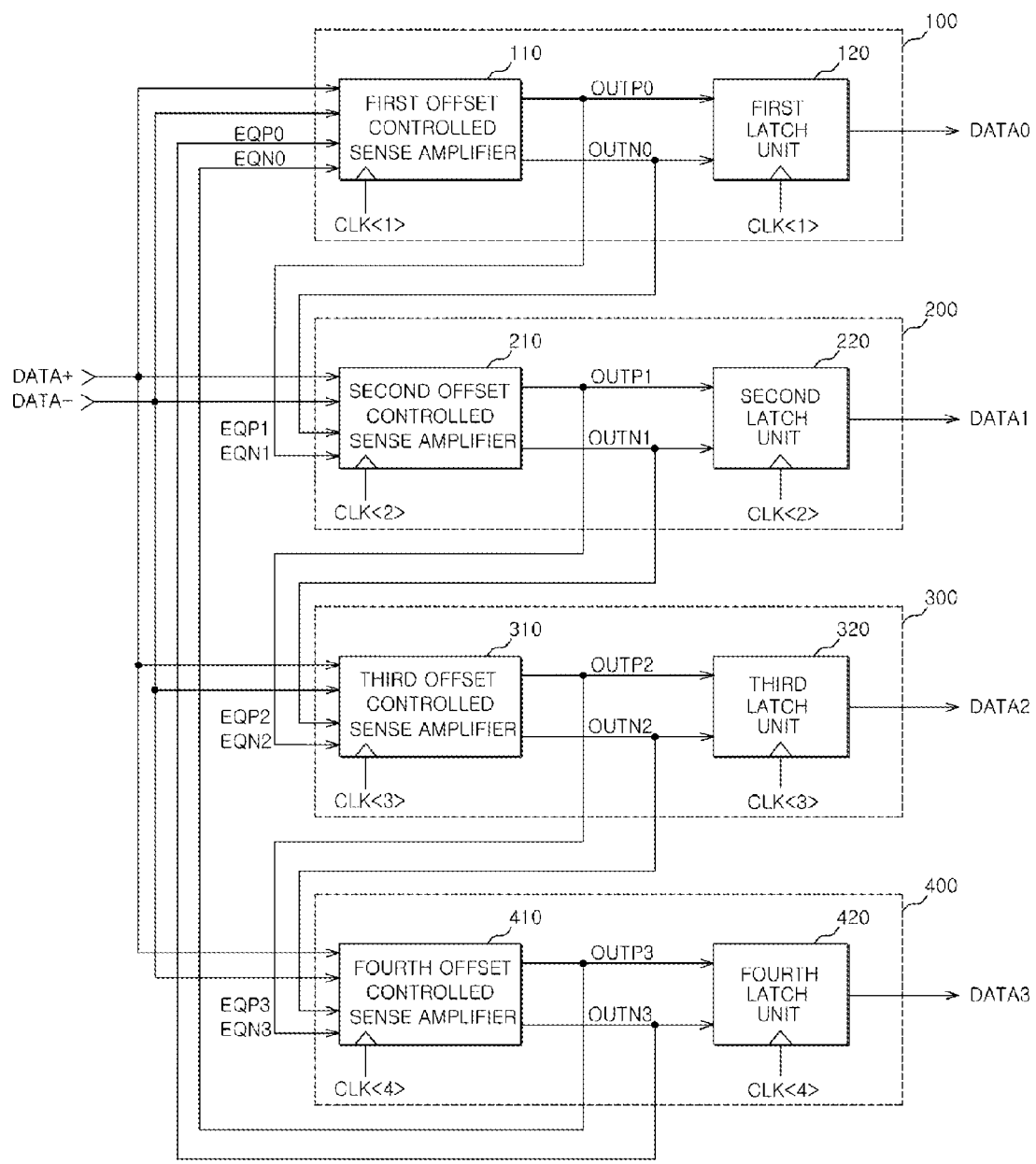
FIG. 1 is a block diagram of a receiver circuit according to an embodiment described herein.

FIG. 1 is a block diagram of a receiver circuit 101 according to an embodiment described herein. Referring to FIG. 1, the receiver circuit 101 can include first to fourth phase transmitters 100, 200, 300, and 400. The first phase transmitter 100 can include a first offset controlled sense amplifier 110 and a first latch unit 120. The second phase transmitter 200 can include a second offset controlled sense amplifier 210 and a second latch unit 220. The third phase transmitter 300 can include a third offset controlled sense amplifier 310 and a third latch unit 320. The fourth phase transmitter 400 can include a fourth offset controlled sense amplifier 410 and a fourth latch unit 420.

The respective clock signals "CLK<1>" to "CLK<4>" for the first to fourth phase transmitters can have different phases, e.g., the phase differences thereof can be maintained at 90 degrees.

Receiver circuit 101 can be configured to receive input data signals "Data+" and "Data−". Input data signals "Data+" and "Data−" can be transmitted as a positive and negative data pair. For example, the input data signals "Data+" and "Data−" can be low-voltage differential signals like CML (Current-Mode Logic) signals. Therefore, for the purpose of ease of description, it is assumed for the embodiments described herein that the input data signals "Data+" and "Data−" are CML signals although the actual signaling levels can depend on the requirements of a particular implementation.

The first to fourth offset controlled sense amplifiers 110, 210, 310, and 410 can each include capacitors that can change the sense timing for each of the respective sense amplifiers. Data can be output from each of sense amplifiers 110, 210, 310, and 410 in synchronization with the associated clock signal CLK<1> to CLK<4>. The output signals, OUTP<0> to OUTP<3> and OUTN<0> to OUTN<3> can be provided as offset voltages to the next sense amplifier to reduce response speeds. For example, since each of the sense amplifiers 110, 210, 310, and 410 operated on the input data signals "Data+" and "Data−" after the prior sense amplifier, due to the phase difference in clocks CLK<1> to CLK<4>, the results of the prior sensing operation, carried out in the prior sense amplifier can be used to improve the sensing speed of a subsequent sensing operation in a subsequent sense amplifier when a data pattern is changed, resulting in an improvement in the sensing margin of the receiver circuit 101.

Referring to FIG. 1, the first to fourth phase transmitters 100, 200, 300, and 400 driven by four-phase clock signals, that is, the first to forth clock signals "CLK<1>" to "CLK<4>" can each include either a feedback path or a feed-forward path for transmitting the results OUTP<0:3> and OUTN<0:3> to the prior stage or the next stage. More specifically, e.g., the first to third phase transmitters 100, 200, and 300 can forward output results thereof to the next transmitter. Meanwhile, output results of the fourth phase transmitter 400 can be fed back to the first phase transmitter 100. In this case, in order to provide output results of one phase transmitter to another phase transmitter as offset voltages, it is important to connect output terminals of one phase transmitter to input terminals of another phase transmitter so that the input order of the input terminals is the reverse of the output order of the output terminals. Thus the capacitors of the first to fourth offset controlled sense amplifiers 110, 210, 310, and 410 can be used as loads when the data pattern is changed, which will be described below with reference to FIG. 2.

Figure 2:
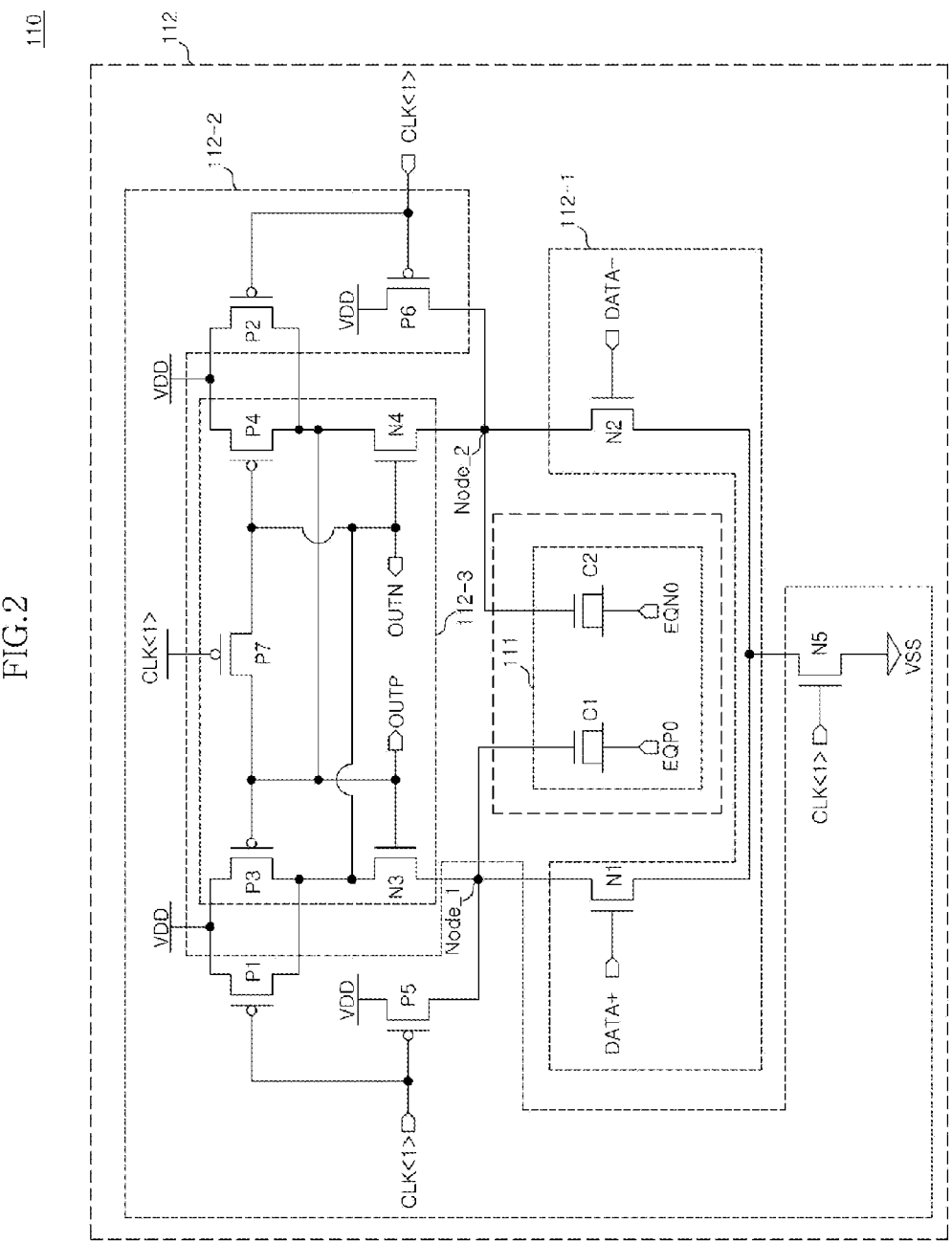
FIG. 2 is a detailed circuit diagram of a first offset controlled sense amplifier that can be included in the diagram illustrated in FIG. 1.

Referring to FIG. 2, the first offset controlled sense amplifier 110 can be driven in sync with the first clock signal "CLK<1>" and the charging and discharging speed of the first offset controlled sense amplifier 110 can be controlled by first offset voltages EQP0 and EQN0 to thereby adjust the timing related to when the input data signals "Data+" and "Data−" are sensed, such that they are sensed earlier than they otherwise would be. The first offset controlled sense amplifier 110 can receive fourth output signals "OUTP3" and "OUTN3" which can be output by the fourth offset controlled sense amplifier 410 as the first offset voltages EQP0 and EQN0, which as mentioned can effect the timing of when the first offset controlled sense amplifier 110 senses the input data signals "Data+" and "Data−".

Here, sensing timing means timing when the first offset controlled sense amplifier 110 receives the input data and determines whether high or low level of each of the input data has been perceived.

Since the first offset controlled sense amplifier 110 can receive the fourth output signals "OUTP3" and "OUTN3" as the first offset voltages EQP0 and EQN0, the sensing timing can be changed according to a variation in the fourth output signals "OUTP3" and "OUTN3". The above-mentioned capacitors can be configured so that the fourth output signals "OUTP3" and "OUTN3" can be used as the first offset voltages "EQP0" and "EQN0". In other words, the first offset controlled sense amplifier 110 can receive the fourth output signals "OUTP3" and "OUTN3" which can have voltage levels, according to the capacitances of the capacitors, used to control the sensing timing. Each of the second to fourth offset controlled sense amplifiers 210, 310, and 410 can vary the sensing timing in the above-mentioned manner.

More specifically, the second offset controlled sense amplifier 210 can be driven in sync with the second clock signal "CLK<2>" and the discharging speed can be controlled by second offset voltage EQP1 and EQN1 to speed up the timing of when the input data signals "Data+" and "Data−" are sensed. The third and fourth offset controlled sense amplifiers 310 and 410 can operate similarly to the first and second offset controlled sense amplifiers 110 and 210, and thus a description thereof is omitted for brevity.

The first to fourth latch units 120, 220, 320, and 420 can respectively latch outputs of the first to fourth offset controlled sense amplifiers 110, 210, 310, and 410 and can output them. The first to fourth latch units 120, 220, 320, and 420 can, e.g., each be implemented by a conventional SR latch circuit receiving a synchronous clock signal.

The first to fourth offset controlled sense amplifiers 110, 210, 310, and 410, according to one embodiment herein can each change the sensing timing according to the levels of the offset voltages, and thereby improve a sensing margin. That is, it is possible to cope with an insufficient margin when the levels of the input data are different from the levels of the previous input data.

FIG. 2 is a detailed circuit diagram of the first offset controlled sense amplifier 110 shown in FIG. 1. The first offset controlled sense amplifier 110 shown in FIG. 2 can include a sense amplifier 112 and a discharging controller 111. The discharging controller 111 can control the sensing timing of the sense amplifier 112 according to the first offset voltages EQP0 and EQN0.

As shown in FIG. 2, the discharging controller 111 can include a first MOS capacitor C1 and a second MOS capacitor C2. The first MOS capacitor C1 can be connected between the input terminal through which the first offset voltage EQP0 is input and a first node Node_1. The second MOS capacitor C2 can be connected between the input terminal through which the first offset voltage EQN0 can be input and a second node Node_2. The discharging controller 111 can be configured with capacitors implemented by NMOS transistors.

Specifically, the gate of the first MOS capacitor C1 can be connected to the first node Node_1 and the drain and source of the first MOS capacitor C1 can be connected to the input terminal through which the first offset voltage EQP0 can be applied. Further, the gate of the second MOS capacitor C2 can be connected to the second node Node_2 and the drain and source of the second MOS capacitor C2 can be connected to the input terminal through which the first offset voltage EQN0 is input.

The sense amplifier 112 can amplify the input data signals "Data+" and "Data−" in sync with the first clock signal "CLK<1>". The sense amplifier 112 can include an input comparator 112-1, a driver 112-2, and an amplifier 112-3. The input comparator 112-1 can receive the input data "Data+" and "Data−" and can control potentials on the first node, Node_1, and the second node, Node_2. The input comparator 112-1 can be implemented with first and second NMOS transistors N1 and N2.

The driver 112-2 can drive the sense amplifier 112 in sync with the first clock signal "CLK<1>". The driver 112-2 can be implemented with a fifth NMOS transistor N5, first and second PMOS transistors P1 and P2, and fifth to seventh PMOS transistors P5 to P7.

The amplifier 112-3 can amplify the output signals "OUTP" and "OUTN" according to the potentials on the first node Node_1 and the second node Node_2. The amplifier 112-3 can be implemented with third and fourth NMOS transistors N3 and N4 and third and fourth PMOS transistors P3 and P4.

Each of the second to fourth offset controlled sense amplifiers 210, 310, and 410 shown in FIG. 1 can have the same configuration as the first offset controlled sense amplifier 110 shown in FIG. 2, except that offset voltages input to the corresponding offset controlled sense amplifier can be different from the first offset voltages and output signals output from the corresponding offset controlled sense amplifier are different from those of the first offset controlled sense amplifier.

Referring to the operation of the first offset controlled sense amplifier 110 shown in FIG. 2, when the first clock signal "CLK<1>" is disabled, the first PMOS transistor P1 and the second PMOS transistor P2 are turned on, and thus, the output signals "OUTP" and "OUTN" each can transition to a high level. Accordingly, the third and fourth NMOS transistors N3 and N4 can be turned on and thus the first node Node_1 and the second node Node_2 can be precharged to a high level.

When the first clock signal "CLK<1>" is enabled, the fifth NMOS transistor N5 can be turned on. Accordingly, a current path can be formed in the first offset controlled sense amplifier 110 and the output signals "OUTP" and "OUTN", which can be amplified according to the levels of the input data signals "Data+" and "Data−", are output. In other words, when the first clock signal "CLK<1>", e.g., goes high, the output signals "OUTP" and "OUTN" according to the levels of the input data signals "Data+" and "Data−", can be provided, and when the first clock signal "CLK<1>", e.g., goes low, the first node Node_1 and the second node Node_2 can be precharged such that the output signals "OUTP" and "OUTN" can be provided, e.g. each at a high level.

When the input data signals "Data+" and "Data−" have a high and low level respectively, the first NMOS transistor N1 can be turned on. Accordingly, the potential on the first node Node_1 can transition to a low level and the potential on the second node Node_2 can transition to a high level. Therefore, the voltage difference between the gate and source of the third NMOS transistor N3 can become larger than the voltage difference between the gate and source of the fourth NMOS transistor N4. As a result, the output signals "OUTP" and "OUTN" can transition to high and low levels, respectively.

The first offset controlled sense amplifier 110, according to an embodiment herein can more rapidly sense the potentials on the first and second nodes Node_1 and Node_2. For example, when the first clock signal "CLK<1>" is disabled, e.g., low, the first node Node_1 and the second node Node_2 can be precharged such that the output signals "OUTP" and "OUTN" are at a high level. Then when the first clock signal "CLK<1>" is enabled, the first offset voltages EQP0 and EQN0 having high and low levels, respectively, can be input.

Meanwhile, when output signals "OUTP3" and "OUTN3" at the previous stage of the first offset controlled sense amplifier 110 have low and high levels, respectively, the output signal "OUTP3", having a low level can be provided as the offset voltage EQN0, and the output signal "OUTN3", having a high level can be provided as the offset voltage EQP0. In other words, one of the output signals of an offset controlled sense amplifier, corresponding to a positive input data of an input data, can be provided to an input terminal of the next offset controlled sense amplifier that receives a negative input data signal as an offset voltage for a capacitor connected to the input terminal of the next offset controlled sense amplifier. Further, the other output signal of the offset controlled sense amplifier, corresponding to a negative input data of the input data pair, can be provided to an input terminal of the next offset controlled sense amplifier to which a positive input data signal is applied, as an offset voltage for a capacitor connected to the input terminal of the next offset controlled sense amplifier.

Therefore, if the first offset voltages EQP0 and EQN0, having high and low levels, respectively, are provided, then that output data at the pre-stage had low and high levels, respectively.

If the data pattern is changed so that the input data signals "Data+" and "Data−" have high and low levels, respectively, high-level signals can be applied to both terminals of the first MOS transistor C1, so the first MOS transistor C1 does not operate. In this case, the second MOS transistor C2 can receive a high-level signal through one terminal and a low level signal through the other terminal, so that the second MOS transistor C2 can operate. Therefore, the potentials on the first node Node_1 and the second node Node_2, determined according to the input data signals "Data+" and "Data−" can be varied by the second MOS transistor C2. In other words, when the sense amplifier is driven, the potential on the first node Node_1 does not affect to the first MOS capacitor C1 and the first node Node_1 can be discharged by the high-level input data signal "Data+" at the same speed as in a conventional devices.

Meanwhile, since the input data signal "Data−" can have a low level which is, e.g., a low CML level, the second NMOS transistor is not completely turned off. Therefore, the second node Node_2 can be gradually discharged from a high level to a low level. At this time, a load can occur by the MOS transistor C2, and accordingly, the second node Node_2 can be gradually discharged (unlike conventional circuits). As a result, the timing of when a differential voltage between the input data signals "Data+" and "Data−" becomes a predetermined value is earlier than in a conventional circuit.

In a conventional circuit, a predetermined differential voltage between input data signals "Data+" and "Data−", that is, a reference voltage capable of being sensed, is generated after a predetermined time period elapses. Accordingly, a sense amplifier senses the input data signals "Data+" and "Data−" using the predetermined differential voltage only after the predetermined time period elapses. However, unlike a conventional circuit, the timing of when the predetermined differential voltage is generated can be earlier due to the loading effect of the capacitor in the embodiments described above.

As described above, a sense amplifier can have its output terminals cross-coupled to input terminals of another, or next sense amplifier to provide output results to the sense amplifier at the next stage as offset voltages. Therefore, if the data pattern is changed (if the levels of the input data are changed), the loading effect of the capacitor appears. As a result, the timing of when the predetermined differential voltage is generated can be earlier, resulting in a sufficient sensing margin.

If the first offset voltages EQP0 and EQN0 have high and low levels, respectively, and the input data signals "Data+" and "Data−" have low and high levels, respectively, then the pattern of data from the fourth offset controlled sense amplifier to the first offset controlled sense amplifier has not been changed. In such a case, the terminals of the first MOS capacitor C1 can both have high levels, and the terminals of the second MOS capacitor C2 can have high and low levels, respectively, in contrast with the case in which the data pattern is changed. Therefore, the first MOS capacitor C1 would not operate and only the second MOS capacitor C2 would operate.

In this case, when the first NMOS transistor N1 receives the input data signal "Data+", which is at a weak low level, is weakly turned on and the first MOS capacitor C1 does not take the loading effect and is thus discharged at the same speed as that in the conventional circuit. Further, when the second NMOS transistor receiving the input data signal "Data−" at a high level is turned on, the second node Node_2 can be influenced by the second MOS capacitor C2 so as to be discharged more slowly as compared to a conventional circuit. However, if the level of the input data signal "Data−" is at a high level, then the loading effect of the second MOS capacitor C2 may be weak. Furthermore, it is not required to rapidly sense the differential voltage between the input data signals "Data+" and "Data−" unless the data pattern is not changed. Therefore, slow discharging by the capacitor does not have an effect on the sensing operation.

When a data pattern is changed in a RF clock signal system it is possible to control the capacitance of the capacitor in order to improve the sensitivity of a receiver circuit more quickly. For example, a change in the data pattern can be sensed by increasing the discharging speed of a terminal receiving the high-level input signal and decreasing the discharging speed of a terminal receiving the low-level input signal, resulting in an improvement in the sensing margin.

When the pattern of data in the sense amplifier driven in sync with the first clock signal "CLK<1>" is changed, it is possible to increase a sensing speed by decreasing the discharging speed by use of the offset voltages EQP0 and EQN0 and the MOS capacitors C1 and C2. The second to fourth offset controlled sense amplifiers 210, 310, and 410 can be described in the same way as the first offset controlled sense amplifier 110 shown in FIG. 2, and thus a description thereof is omitted.

Figure 3A:
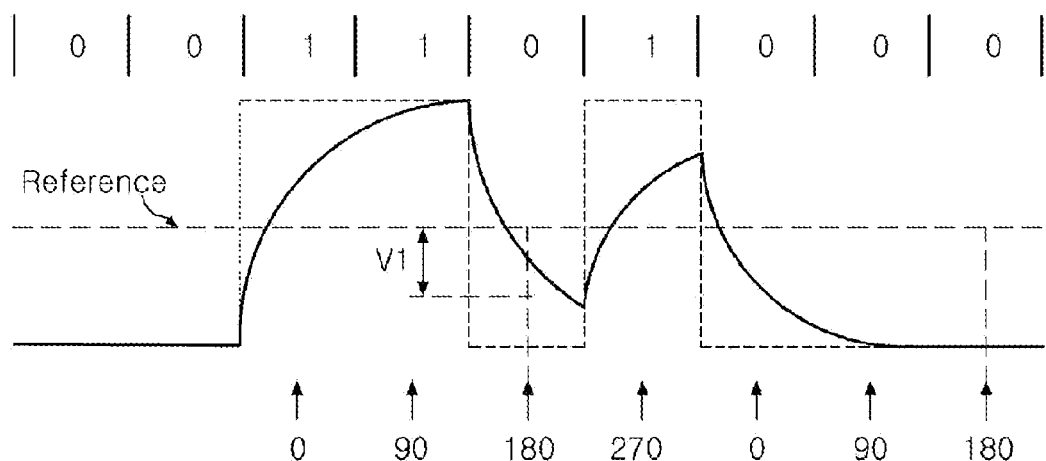
FIG. 3A is a drawing illustrating a waveform of an output signal of a conventional receiver circuit.
Figure 3B:
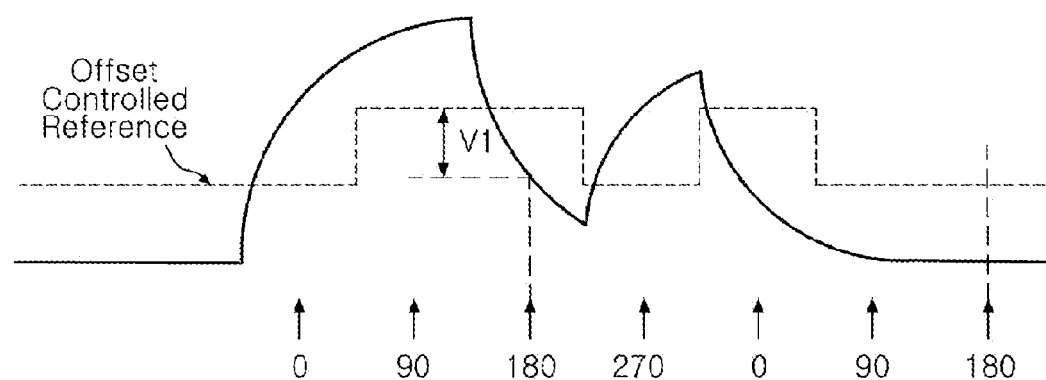
FIG. 3B is a drawing illustrating a waveform of an output signal of the receiver circuit which can be included in the diagram illustrated in FIG. 1.

Referring to FIGS. 3A and 3B, it can be seen that, when the data pattern is changed from 1 to 0 or vice versa, the output signals are not completely changed to a CMOS high level or a CMOS low level in a RF clock signal system.

For this reason, a predetermined voltage V1 can be generated later than a reference voltage by a predetermined time period, as shown in FIG. 3A. Here, the reference voltage can be a predetermined differential voltage of a receiver receiving input signals. A receiver circuit for sensing a predetermined differential voltage may provide the output signals "OUTP" and "OUTN" when the predetermined time period elapses after the reference voltage is generated, as if the reference voltage is generated at that time.

Referring to FIG. 3B, the waveform of each of the output signals "OUTP" and "OUTN" can be the same as or similar to that in the related art. However, offset voltages can make a reference voltage for the output signals higher as compared to the related art. As a result, the timing when input signals are sensed is earlier.

As described above, the receiver circuit can transmit data when any one of the four clock signals is enabled, resulting in high-speed data transmission. The receiver circuit can sense signals in reference to four clock signals having different phases. However, the number of clock signals is not limited thereto. The receiver circuit according can achieve equalization with a simple structure and without using a complicated circuit. Furthermore it can take up less area, has an excellent noise characteristic, and consumes less power. The receiver circuit described with reference to FIGS. 1 and 2 can transmit data without deterioration as described above. Furthermore, the receiver circuit can be implemented in smaller area with MOS capacitors and can be easily applied to any circuit. The receiver circuit can be applied to various fields such as memory, CPU, and ASIC.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A receiver circuit for sensing and transmitting input data in sync with a plurality of clock signals having different phases sequentially enabled, the receiver circuit comprising:
    a sense amplifier configured to receive first signals as offset voltages, the first signals obtained by amplifying the input data in sync with a first clock signal of the plurality of clock signals, being driven in sync with a second clock signal enabled subsequent to the first clock signal, and configured to output second signals;
    a discharging controller configured to control a drive speed by controlling a discharging speed of the sense amplifier according to the offset voltages;
    a second sense amplifier configured to be synchronized with a third clock signal enabled subsequent to the second clock signal, and further configured to receive the second signals as second offset voltages, and sense and amplify the input data; and
    a second discharging controller coupled to the second sense amplifier, the second discharging controller configured to control potentials on nodes of the second sense amplifier according to the second offset voltages and to control a driven speed of the second sense amplifier.

2. The receiver circuit of claim 1, wherein the discharging controller is further configured to control the discharging speed of the sense amplifier driven in sync with the second clock signal, and configured to make sensing timing earlier when input data received while the first clock signal is enabled and input data received while the second clock signal is enabled have different levels.

3. The receiver circuit of claim 1, wherein the discharging controller comprises capacitors connected between offset voltage input terminals and the nodes.

4. The receiver circuit of claim 3, wherein the capacitors are implemented by MOS transistors.

5. The receiver circuit of claim 4, wherein the MOS transistors are NMOS transistors configured with gates connected to the nodes and sources and drains connected to the offset voltage input terminals.

6. The receiver circuit of claim 1, wherein the sense amplifier comprises:
    an input comparator configured to receive the input data and controlling potentials on a first node and a second node;
    a driver coupled to the input comparator, the driver configured to drive the sense amplifier in sync with the second clock signal; and
    an amplifier coupled to the input comparator and the driver, the amplifier configured to amplify the input data according to the potentials on the first node and the second node and output the amplified input data as output signals.

7. The receiver circuit of claim 6, wherein the discharging controller comprises:
    a first NMOS capacitor connected between one of two offset voltage input terminals and the first node; and
    a second NMOS capacitor connected between the other offset voltage input terminals and the second node.

8. A receiver circuit for receiving sequential input data pairs in sync with first and second clock signals having mutually different phases, the circuit comprising:
    a first phase transmitter configured to control sensing timing according to offset voltages, sense a differential voltage between a pair of input data, and generate a pair of first output signals in sync with the first clock signal, the pair of first output signals configured to be provided to a second phase transmitter as offset voltages; and
    the second phase transmitter coupled to the first phase transmitter, the second phase transmitter configured to control sensing timing according to offset voltages, sense the differential voltage between the pair of input data, and generate a pair of second output signals in sync with the second clock signal, the pair of second output signals of the second phase transmitter are provided to the first phase transmitter as offset voltages, wherein one output signal, corresponding to positive input data of the pair of input data, of the pair of output signals of each of the first and second phase transmitters, is configured to be provided as an offset voltage for a capacitor corresponding to one node connected to a negative input data input terminal of the next phase transmitter, and the other output signal, corresponding to negative input data of the pair of input data, of the pair of output signals of the corresponding phase transmitter, is configured to be provided as an offset voltage for the other capacitor corresponding to the other node connected to a positive input terminal of the next phase transmitter.

9. The receiver circuit of claim 8, wherein each of the first and second phase transmitters comprises:
  a sense amplifier configured to sense and amplify the pair of input data in sync with a corresponding clock signal; and
  a latch unit configured to the sense amplifier, the latch unit configured to latch output results of the sense amplifier.

10. The receiver circuit of claim 9, wherein the sense amplifier comprises:
  an input comparator configured to receive the pair of input data;
  a driver coupled to the input comparator, the driver configured to control whether to drive the sense amplifier in response to the corresponding clock signal;
  an amplifier coupled to the input comparator and the driver, the amplifier configured to amplify a differential voltage which is an output signal of the input comparator; and
  a discharging controller coupled to the input comparator, the driver, and the amplifier, the discharging controller configured to connect to the input comparator, receive corresponding offset voltages, and control a discharging speed of the input comparator.

11. The receiver circuit of claim 10, wherein the input comparator comprises first and second NMOS transistors configured to receive the pair of input data.

12. The receiver circuit of claim 11, further comprising:
  a first node connected to a drain of the first NMOS transistor; and
  a second node connected to a drain of the second NMOS transistor.

13. The receiver circuit of claim 12, wherein each of the first and second nodes is configured to be precharged to a high level when the corresponding clock signal is enabled.

14. The receiver circuit of claim 13, wherein the discharging unit comprises MOS capacitors having gates connected to the first and second nodes.

15. The receiver circuit of claim 14, wherein one node of the first and second nodes, which is connected to a capacitor receiving the lower-level offset voltage of the offset voltages, is configured to be more slowly discharged.

16. The receiver circuit of claim 8, wherein the levels of the input data are CML (Current-Mode Logic) levels.

* * * * *